United States Patent [19]
Bullock et al.

[11] Patent Number: 5,623,195
[45] Date of Patent: Apr. 22, 1997

[54] APPARATUS AND METHOD FOR CONTROLLING A CHARGING VOLTAGE OF A BATTERY BASED ON BATTERY TEMPERATURE

[75] Inventors: Norma K. Bullock, Rockwall; Douglas G. Fent, Mesquite; Trung V. Nguyen, Dallas, all of Tex.

[73] Assignee: Lucent Technologies Inc., Murray Hill, N.J.

[21] Appl. No.: 263,971

[22] Filed: Jun. 22, 1994

[51] Int. Cl.$^6$ .................................................. H01M 10/46
[52] U.S. Cl. ................................................. 320/22; 320/35
[58] Field of Search ............................... 320/20, 21, 22, 320/24, 30, 35, 36, 39, 40, 48

[56] References Cited

U.S. PATENT DOCUMENTS

| | | | |
|---|---|---|---|
| 4,125,802 | 11/1978 | Godard | 320/35 |
| 4,433,277 | 2/1984 | Corollo et al. | 320/24 |
| 4,710,694 | 12/1987 | Sutphin et al. | 320/21 |
| 5,150,033 | 9/1992 | Conway | 320/51 |
| 5,166,596 | 11/1992 | Goedken | 320/35 |
| 5,204,611 | 4/1993 | Nor et al. | 320/21 |
| 5,289,102 | 2/1994 | Toya | 320/22 |
| 5,339,108 | 8/1994 | Brokaw | 320/35 |

FOREIGN PATENT DOCUMENTS

| | | |
|---|---|---|
| 2308653 | 3/1989 | European Pat. Off. . |
| 2385145 | 9/1990 | European Pat. Off. . |
| 2532232 | 3/1993 | European Pat. Off. . |
| WOA19222120 | 12/1992 | WIPO . |
| WOA19407292 | 3/1994 | WIPO . |

OTHER PUBLICATIONS

Proceedings, Twelfth International Telecommunications Energy Conference, Nagai, Y. and Ozaki, K., IEEE, Paper No. CH2928-0/90/0000/155, New York, pp. 155-160.

Proceedings, Fourteenth International Telecommunications Energy, Harrison, A. I., IEEE, Paper No. 0-7803-0779-8/92, New York pp. 28-34.

Bellcore Technical Advisory TA-NWT-001515, Issue 1, Dec. 1993.

Proceedings, Nineteenth Intersociety Energy Conversion Conference, Delaney, W. C., McKinney, B. L., Mrotek, E. N., Weinlein, C. E., San Francisco, California, Aug. 19–24, 1984, pp. 779–785.

(List continued on next page.)

*Primary Examiner*—Peter S. Wong
*Assistant Examiner*—E. Tso
*Attorney, Agent, or Firm*—Alfred G. Steinmetz

[57] ABSTRACT

A battery charging system controls and modifies the output voltage of the charging rectifier in response to differing temperature ranges of the battery. At a low range of temperatures starting at a low temperature (e.g. within a range of 0 to 25° C. to about 53° C.) the rectifier voltage decreases as the temperature increases to prevent charging current from rising as the battery temperature increases. This change is performed in accord with a linear graphical slope relating the change of charging voltage to temperature. A suitable charging voltage decrease rate may be 3 mV/° C./cell with a range of 1.5 mV/° C./cell to 5 mV/° C./cell being acceptable. Reduction of the charging voltage within this range reduces the aging effect of high temperature operation of the battery. The charging voltage applied to the battery is held at a constant value over a subsequent range of temperatures (e.g. 53° C. to 75° C.) in order to prevent accelerated grid corrosion within the battery, which normally occurs as the voltage approaches the fully charged open circuit voltage level of the battery. At attainment of a high threshold temperature at the high end of the second temperature range (e.g. 75° C.) the charging voltage level is dropped as a step function to a level below the fully charged open circuit voltage threshold of the battery to arrest the thermal runaway situation. At this level the battery is maintained at partial, but not full, state of charge by the rectifiers, and an alarm signal is generated to alert the maintenance staff to this situation.

17 Claims, 2 Drawing Sheets

OTHER PUBLICATIONS

"Thermal Runaway—A System for a System Problem", McMenamin, D., IEEE, Paper No. 0–7803–0779, Aug. 1992, pp. 18–21.

"Thermal Runaway Prevention By Control of Float Voltage as a Function of Battery Temperature", IEEE, Paper No. 0–7803–0779, Aug. 1992, pp. 47–50.

"Use of Temperature Compensating Device in Telecom Cabinets Exposed to Outdoor Environments", McFadden, A. A., IEEE, Paper No. 0–7803–0779, Aug. 1992, pp. 41–46.

APPARATUS AND METHOD FOR CONTROLLING A CHARGING VOLTAGE OF A BATTERY BASED ON BATTERY TEMPERATURE

FIELD OF THE INVENTION

This invention is concerned with the charging of batteries and in particular with a charging method and apparatus that is based on a temperature of the battery.

BACKGROUND OF THE INVENTION

The temperature of a charging battery is a critical factor in the proper control and the ultimate safety of equipment and personnel in the charging process. If the temperature of the battery increases significantly, the internal resistance of the battery decreases and consequently the charging current increases, causing further decrease of the internal resistance. This cumulative effect soon leads to "thermal runaway", eventually resulting in destruction of the battery and perhaps in catastrophic circumstances to surrounding equipment and personnel.

Prior battery charging systems have controlled charging voltage in response to the temperature of the battery. These systems generally reduce the battery charging voltage as the battery temperature rises in a simple linear ramp or single voltage step to a voltage or temperature limit. Most battery manufacturers recommend that the charging voltage be decreased or "compensated" for increasing temperature at a fixed value of X mV/° C./cell. This is discussed by Y. Nagai and K. Ozaki in Proceedings, Twelfth International Telecommunications Energy Conference, Paper #CH2928-0/90/0000/0155, IEEE (New York 1990) pp. 155–160 (see FIG. 3) in which a change in the charging voltage of −3 mV/° C./cell between 0° and 50° C. is shown. An alternative approach is charging at 2.275 V/cell from 0° to 35° C. and 2.215 V/cell from 35° to 50° C. A. I. Harrison, in Proceedings, Fourteenth International Telecommunications Energy Conference, Paper #0-7803-0779-8/92, IEEE (New York 1992), pp. 28–34 (see FIG. 5) shows a steady decrease in charging voltage from 2.36 to 2.20 V over the temperature range from 0 to 40° C. Bellcore Technical Advisory TA-NWT-001515 Issue 1, December 1993, recommends a voltage decrease of 3 mV/° C./cell to a limit of 2.17 V/cell when the cell or battery temperature is between 10°±1° and 15°±1° C. above the ambient temperature. The float voltage may alternatively be reduced by 1.5 mV/° C./cell. Major alarms are sent when the battery temperature is at 10°±1° C. above the ambient temperature and also when the battery temperature is 15°±1° C. above ambient temperature. The voltage may also be reduced in a step function to 2.21 V/cell at a battery temperature 10°±1° C. above ambient and to 2.17 V/cell at a battery temperature 15°±1° C. above ambient. Since the measured ambient temperature can vary over a wide range, controlling voltage as a function of the difference between the ambient and battery temperatures is not a precise method of controlling the battery charging characteristic. Furthermore, measurement of ambient temperature requires one or more additional sensors and is highly dependent on sensor location, reducing reliability and increasing cost.

These step and linear ramp decreases in voltage with temperature rise protect the battery and environment under normal operating conditions in which the battery temperature does not get much higher than ambient temperature. However, these controlled charging voltage changes do not really address the situation of thermal runaway in which the battery current and temperature can continuously increase to a magnitude where the battery case materials can melt and/or explosive levels of hydrogen gas can be generated. Such a situation can exist if one or more cells in a battery string are at a low voltage level due to a short or a faulty seal while the remainder are being charged at an effectively higher float voltage.

SUMMARY OF THE INVENTION

Constant voltage charging of a valve-regulated lead-acid cell is typically done at voltages in a range of 2.25 to 2.35 V/cell at room temperature in float charge applications. In applications where a faster rate of recharge is needed, the voltage range at room temperature is typically 2.30 to 2.55 V/cell. The present invention will apply to either of these charge modes. A battery charging system, embodying the principles of the invention, controls and modifies the output voltage of a battery charging rectifier in response to differing temperature ranges of the battery temperature. At a low range of temperatures starting at a low temperature (e.g. from a range of 0° to 25° C. to about 53° C.) the rectifier voltage decreases as the temperature increases to prevent charging current from rising as the battery temperature increases. This change is performed in accord with a linear graphical slope relating the change of voltage to battery temperature. A suitable voltage change rate may be 3 mV/° C./cell with a range of 1.5 mV/° C./cell to 5 mV/° C./cell being acceptable to a voltage in a range of 25–50 mV above the fully charged open circuit voltage of the cell. Reduction of the charging voltage within this range reduces the aging effect of high temperature operation of the battery.

The charging voltage applied to the battery is held at a constant value over a subsequent range of battery temperatures (e.g. 53° C. to 75° C.) in order to prevent accelerated grid corrosion within the battery, which normally occurs as the voltage approaches the open circuit voltage level of the battery.

At attainment of a high threshold temperature at the high end of the second temperature range (e.g. 55° to 85° C., with 60° to 80° C. preferred) the charging voltage level is dropped as a step function to a level below a discharge threshold voltage of the battery to arrest the thermal runaway situation. At this level the battery is maintained at partial, but not full, state of charge by the rectifiers, and an alarm signal is generated to alert the maintenance staff of this situation.

This staged discharge control advantageously prevents thermal runaway and catastrophic failure of the battery while still permitting the battery to provide voltage within the acceptable operating range of the load it energizes.

The charging system, in the illustrative embodiment, protects the battery and environment under abusive conditions in which the battery temperature exceeds a set high value. The process of the invention provides protection to the battery and gives maximum discharge time, even when the battery voltage has decreased to 20 to 50 mV/cell above the open circuit voltage, (e.g. 2.17 V) and the battery temperature is still continuing to rise. The battery life is maximized by providing the optimum charging voltage even at abusive charging temperatures and effective charging voltages.

DETAILED DESCRIPTION

Figure 1:
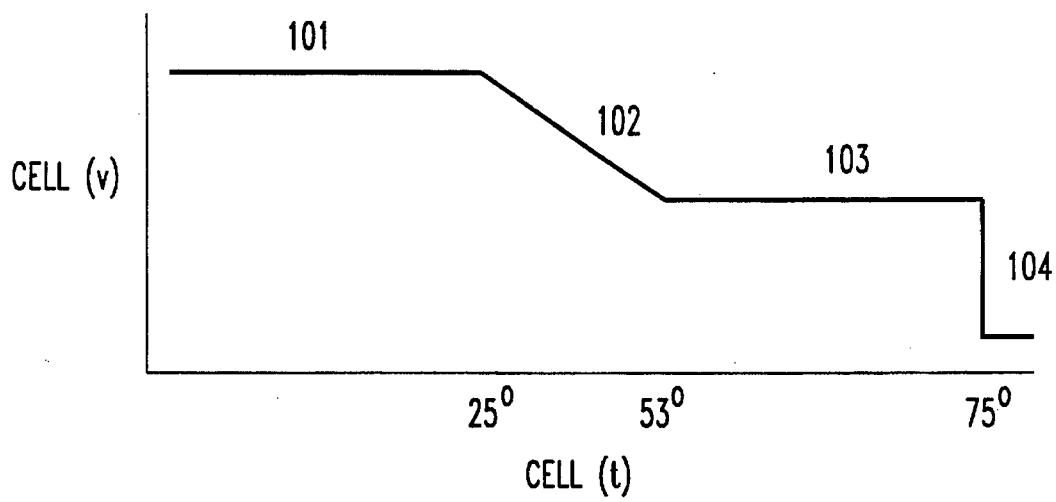
FIG. 1 is a graph showing the relationship of charging voltage to the temperature of the battery.

A temperature responsive battery charging control, as illustrated by the graph of FIG. 1, is applied to the charging of a valve-regulated lead acid cell or battery. These cells or batteries are typically used in remote sites because they have low maintenance requirements. But these batteries are typically very sensitive to temperature effects which may lead to thermal runaway during charging.

The graph of FIG. 1 relates the output voltage of a battery charging rectifier to the temperature of the battery. The vertical voltage axis is expressed in terms of cell voltage and the horizontal temperature is expressed in terms of cell temperature.

The portion of the graph designated 101 is a horizontal line which extends from a range of approximately 0° to 25° C. and below. During this interval, the temperature of the battery is not too high and, hence, the charging voltage supplied by the rectifier is maintained at a constant regulated charging voltage level. If the temperature attains a temperature within the range of 0° to 25° C. the charging voltage level is governed according to the sloped linear portion 102 which continues its downward slope until the battery voltage has been dropped to within a range of 20 to 50 mV (with a preferred range 30 to 40 mV) above the fully charged open circuit voltage of the cell. Generally the reduced charging voltage supplied by the rectifier 201 within this range is sufficient to prevent a thermal runaway. The lower charging current, which results from the lower charging voltage, also reduces the aging effects of high temperature operation of the battery.

If the battery temperature goes above a nominal 53° C., and the charging voltage is within the 20 to 50 mV/cell range above the open circuit voltage, the rectifier charging voltage is regulated at a constant value, as indicated by the horizontal line 103, until the attainment of a battery temperature in a range of approximately 60° to 80° C. Within this range the charging voltage is a magnitude greater than the fully charged open circuit voltage of the battery cells. This constant charging voltage is selected to retard grid corrosion in the battery, which can be excessive near the open circuit voltage.

When the battery temperature reaches a set critical value, set at 75° C. in the illustrative embodiment, the charging voltage is suddenly decreased as a step function 104 to a voltage value below the discharge threshold voltage range of the battery. This voltage is selected, at below discharge voltage threshold, so that the battery discharges slowly, but continues to operate within the proper voltage range of any attached load equipment. Associated with this step is the issuance of a discharge alarm to alert maintenance that the battery is discharging and needs to be serviced.

Figure 2:
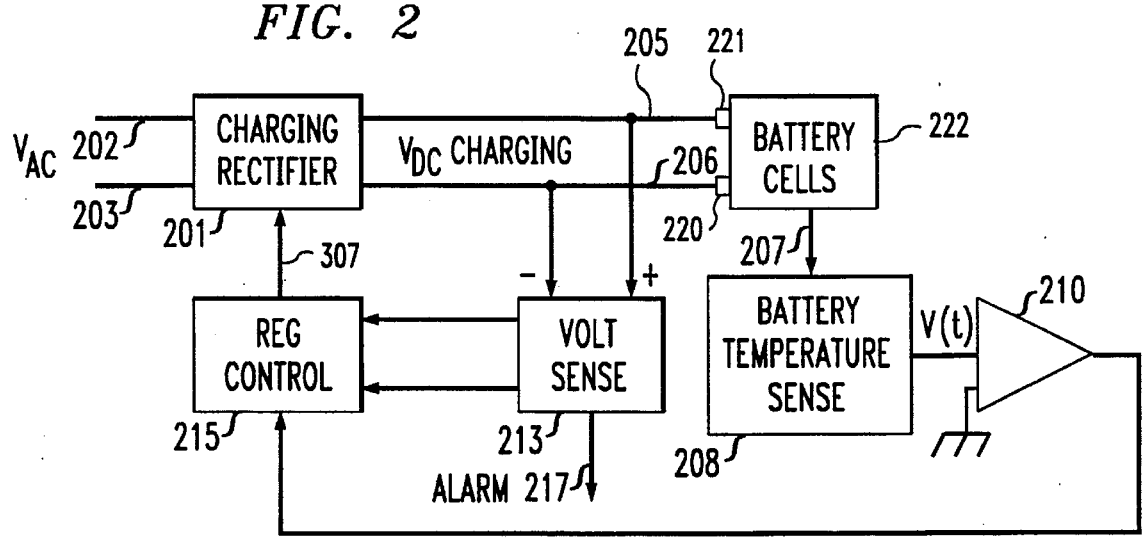
FIG. 2 is a schematic of a battery charging system and control.

The battery charging system as disclosed in the FIG. 2 shows a battery charging rectifier 201 connected to receive an AC supply voltage at its input terminals 202 and 203. The AC voltage is rectified and the DC charging voltage is applied to the battery terminals 205 and 206.

The battery temperature is sensed by a temperature sensor 207 connected to a temperature sensing circuit 208 which converts the temperature to a voltage V(t). This voltage is amplified by amplifier 210 and applied to a regulation control circuit 215.

The regulation control circuit 215 is connected to monitor the terminal voltage of the battery cell via a voltage sense circuit 213 which has leads connected to the terminals 220, 221 of battery cells 222. A battery voltage sense circuit 213 is connected across battery terminals 220, 221, detects the voltages on said terminals and applies a control signal to the regulation control of the rectifier. The temperature input and the voltage sense input are used by the regulation control circuit 215 in setting the voltage output of the rectifier 201 so that it regulates its DC charging to correspond to the control profile illustrated in the FIG. 1. The voltage sense circuit 201 also includes an alarm output 217 to transmit a signal to alert of a battery discharge.

Figure 3:
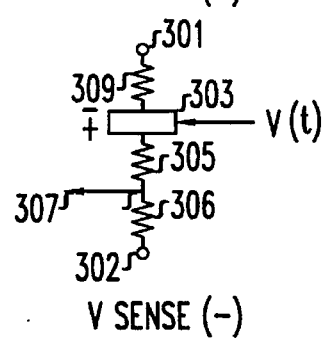
FIG. 3 is a schematic of part of the control circuitry.

The regulation circuitry of the regulation control is shown in FIG. 3. The positive and negative sensed battery terminal voltages are applied to the terminals 301 and 302. The temperature signal V(t) is applied to a programmable voltage source 303 which is serially connected between a circuit branch consisting of positive voltage sense lead 301 and resistor 309, and a voltage divider comprising resistor 305 and 306. Connected to the other end of the voltage divider is the negative voltage sense lead 302. The control signal for controlling the DC voltage output of the rectifier 201 is taken from the center node of the voltage divider on lead 307. The programmable voltage source 303 responds to the temperature sense signal V(t) and produces a voltage drop between its terminals, which connect it in series with the voltage divider to cause the voltage on lead 307 to effect the replication of the voltage/temperature profile of FIG. 1 within the regulation scheme. Programmable voltage sources are commercially available as ICs and it is not believed necessary to describe them in detail.

Figure 4:
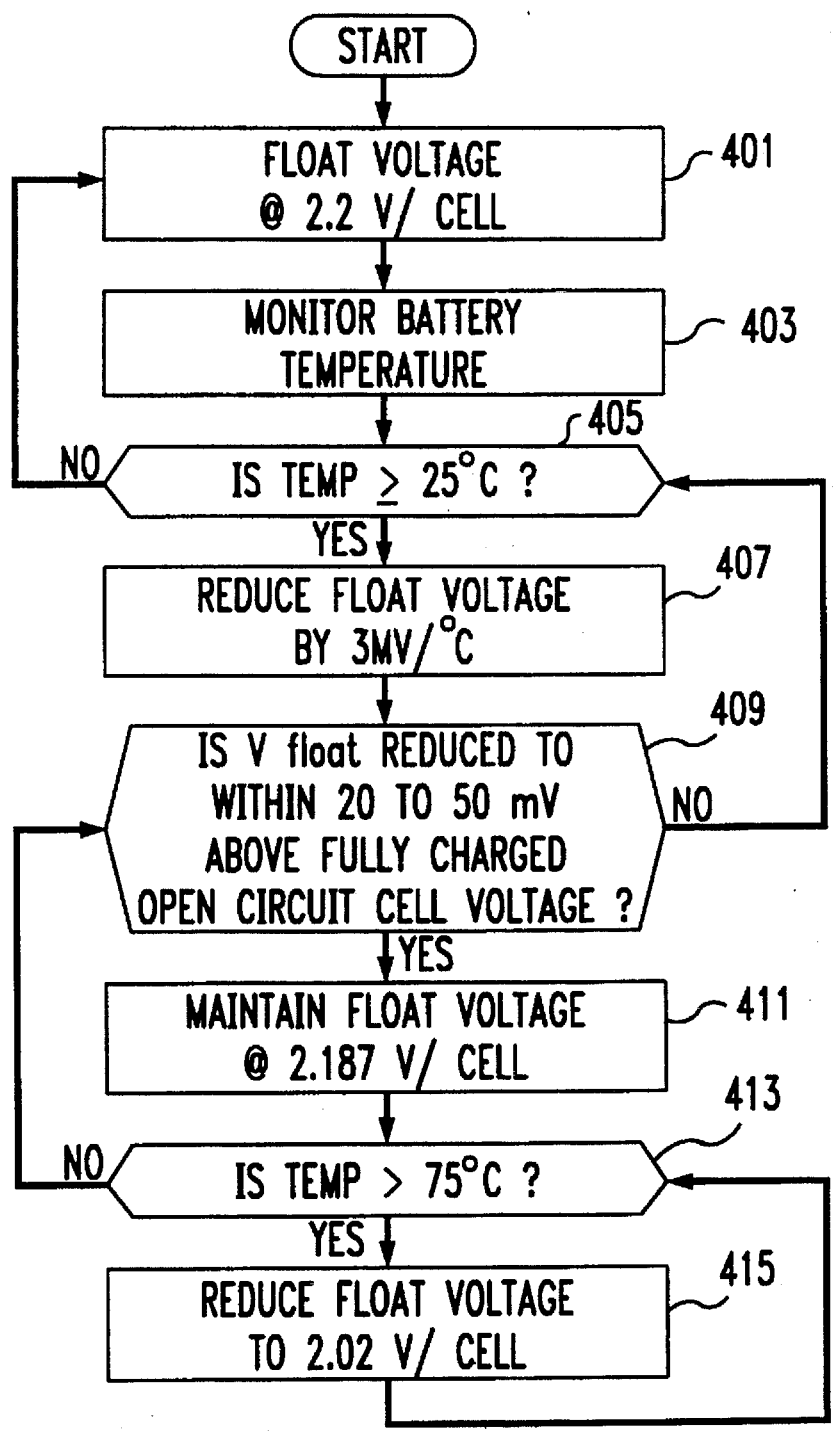
FIG. 4 is a flow process diagram illustrating the operating mode of the battery charging system.

The regulation control 215 may include hardwired logic or a microcomputer with stored program instructions operating in combination with the programmable voltage source 307 to cause regulation to conform to the regulation profile shown in the FIG. 1. An example of the flow process of these instructions is shown in the flow chart shown in FIG. 4. The process of control begins with the instructions of block 401 to float the battery voltage at 2.27 V/cell. The instruction of the subsequent block 403 causes the battery temperature to be monitored. A decision block 405 has instructions which determine if the battery temperature has exceeded 25° C. If the temperature is 25° C. or lower the flow of the process returns to the block 401. If however, the battery temperature exceeds 25° C., the instructions of the subsequent block 407 instruct that the battery voltage be floated at a value reduced from the value of block 401 by 3 mV/° C./cell.

In the subsequent decision block 409 an inquiry is made to determine if the battery float voltage has been reduced to 20 to 50 mV/cell above the fully charged open circuit voltage. A negative response returns the flow to the decision block 405 and the system evaluates the battery temperature level relative to the 25° C. level.

If the battery voltage has been reduced to within 20 to 50 mV/cell above the fully charged open circuit voltage, the subsequent instruction block 411 maintains the battery float voltage at a nominal 2.187 V/cell. A subsequent decision block determines if the battery temperature is equal to or greater than 75° C. Flow returns to the decision block 409 if the 75° C. level has not been reached. If 75° C. has been attained, the flow proceeds to the subsequent instruction block 415, whose commands immediately reduce the float voltage to a level that will result in a battery discharge, e.g. 2.02 V/cell level. This voltage level is below the discharge level of the battery and hence the thermal runaway condition has been aborted. The flow continuously returns to the block 413 to determine if the battery temperature remains at or above 75° C.

In an experimental test of a battery charging system the charging voltage, supplied by a system rectifier, was accurately controlled in accord with the graph of FIG. 1 up to a temperature of 90° C.

We claim:

1. In a voltage sensitive battery charging system for recharging a battery comprising one or more cells said battery being susceptible to thermal runaway during charging due to internal resistance decreases caused by battery temperature increases, said battery having a characteristic discharge threshold voltage, and each cell having a characteristic open circuit voltage when fully charged, said system comprising:

a DC charging voltage source connected to terminals of said battery, battery temperature monitoring means, and voltage sensing means for monitoring voltage on said terminals during charging, a process for linearly regulating said charging voltage to maintain battery temperature below the point of thermal runaway, comprising the steps of:

setting said charge voltage to a first constant voltage level in response to detected battery temperatures within a first predetermined range;

in response to detected battery temperatures within a second predetermined range above said first range, setting said charge voltage to a value that decreases as a linear function from said first constant voltage level to a second constant voltage level;

in response to detected battery temperatures within a third predetermined range above said second range and having a predetermined upper bound, maintaining said voltage charge at said second constant voltage level; and reducing said charge voltage from said second constant level to a trickle charge level sufficient to maintain said battery at a partial but not full state of charge if said battery temperature exceeds said upper bound of said third temperature range.

2. The process of claim 1, wherein, for said linear function, said charge voltage decreases at a said linear rate selected from within a range of substantially 1.5 to 5.0 mV. per degree C. for each said cell.

3. The process of claim 1, wherein said second constant voltage level is set at a point within 20 to 50 mV. above said open circuit voltage of said cells.

4. The process of claim 1, wherein said reduction of charge voltage to trickle charge level occurs in essentially a step function.

5. The process of claim 1, wherein said trickle charge level is set below said discharge threshold voltage of said battery.

6. The process of claims 1, 2, 3, 4, or 5, wherein said regulation of said charging voltage is effected in a programmable voltage source having as continuous inputs an indicia of said battery temperature and indicia of said voltage appearing at respective said terminals of said battery.

7. The process of claim 6, comprising the further step of generating charge voltage control signals in said programmable voltage source responsive to said named inputs to said source, said control signals effecting said charge voltage levels as a function of said detected battery temperatures and of said open circuit voltage of said battery.

8. The process of claim 7, wherein said battery being recharged comprises one or more valve-regulated lead acid cells and said charge voltage first constant level is set to within a range of 2.25 to 2.35 volts per cell when said detected battery temperatures are in an ambient temperature range up to approximately 25 degrees C.

9. The process of claim 8, wherein, when said battery temperature reaches approximately 25 degrees C., said charge voltage decreases at a linear rate of 3.0 mV. per degree C. for each said cell.

10. The process of claim 9, wherein said second charge voltage level is set at approximately 25–50 millivolts above the fully charged open circuit voltage of each said cell by the time said battery temperature reaches approximately 53 degrees C.

11. The process of claim 10, wherein said third predetermined battery temperature range is from approximately 53 to 75 degrees C.

12. The process of claim 11, comprising the further step of generating an alert signal in response to said reducing of said charge voltage to said trickle charge.

13. A voltage sensitive battery charging system for recharging a battery comprising one or more cells said battery being susceptible to thermal runaway during charging due to internal resistance decreases caused by battery temperature increases, said battery having a characteristic discharge threshold voltage, and each cell having a characteristic open circuit voltage when fully charged, said system comprising:

a DC charging voltage source including float charge capability, connected to terminals of said battery;

battery temperature monitoring means;

voltage sensing means for monitoring voltage on said battery terminals during charging;

means for linearly regulating said charging voltage to maintain battery temperature below the point of thermal runaway, comprising:

first means for setting said charge voltage to a first constant voltage level in response to detected battery temperatures within a first predetermined range;

second means responsive to detected battery temperatures within a second predetermined range above said first range, for setting said charge voltage to a value that decreases as a linear function from said first constant voltage level to a second constant voltage level;

third means responsive to detected battery temperatures within a third predetermined range above said second range having a predetermined upper bound, for maintaining said voltage charge at said second constant voltage level; and fourth means for reducing said charge voltage from said second constant level to a trickle charge level sufficient to maintain said battery at a partial but not full state of charge if said battery temperature exceeds the upper bound of said third temperature range.

14. Apparatus in accordance with claim 13, wherein said second means comprises means for effecting a linear decrease of said charge voltage at a rate selected from within a range of substantially 1.5 to 5.0 mV. per degree C. for each said cell.

15. Apparatus in accordance with claim 14, wherein said second constant voltage level is set at a point within 20 to 50 mV. above said open circuit voltage of said cells.

16. Apparatus in accordance with claim 15, further comprising means for effecting said reduction of charge voltage to trickle charge level in essentially a step function.

17. Apparatus in accordance with claim 16, wherein said trickle charge level is set below said discharge threshold voltage of said battery.

* * * * *